(12) United States Patent
McColloch

(10) Patent No.: US 9,140,861 B2
(45) Date of Patent: Sep. 22, 2015

(54) OPTICAL CONNECTOR HAVING STEPPED ALIGNMENT PINS

(71) Applicant: Avago Technologies General IP (Singapore) Pte. Ltd., Singapore (SG)

(72) Inventor: Laurence R. McColloch, Santa Clara, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 170 days.

(21) Appl. No.: 13/803,993

(22) Filed: Mar. 14, 2013

(65) Prior Publication Data

US 2014/0270653 A1    Sep. 18, 2014

(51) Int. Cl.
| | |
|---|---|
| G02B 6/36 | (2006.01) |
| G02B 6/38 | (2006.01) |
| B24B 37/00 | (2012.01) |
| B24B 1/00 | (2006.01) |
| G02B 6/42 | (2006.01) |

(52) U.S. Cl.
CPC ............ *G02B 6/3885* (2013.01); *G02B 6/3883* (2013.01); *B24B 1/00* (2013.01); *B24B 37/00* (2013.01); *G02B 6/4292* (2013.01); *Y10T 29/49195* (2015.01)

(58) Field of Classification Search
CPC .. G02B 6/3806; G02B 6/3807; G02B 6/3873; G02B 6/381; G02B 6/3885; G02B 6/3883; G02B 6/4219; B24B 37/00; B24B 1/00
USPC ...................................... 385/53–92
See application file for complete search history.

(56) References Cited

U.S. PATENT DOCUMENTS

| | | | | |
|---|---|---|---|---|
| 5,337,388 | A | * | 8/1994 | Jacobowitz et al. ............ 385/76 |
| 5,664,039 | A | * | 9/1997 | Grinderslev et al. ........... 385/65 |
| 6,129,865 | A | | 10/2000 | Jeong et al. |
| 6,276,842 | B1 | | 8/2001 | Xu et al. |
| 6,287,017 | B1 | * | 9/2001 | Katsura et al. ................. 385/59 |
| 2011/0262075 | A1 | | 10/2011 | Beatty et al. |

FOREIGN PATENT DOCUMENTS

| | | |
|---|---|---|
| CN | 201757792 | 3/2011 |
| CN | 202204962 | 4/2011 |

\* cited by examiner

*Primary Examiner* — Akm Enayet Ullah
*Assistant Examiner* — Michael Mooney

(57) ABSTRACT

An optical connector has guide pins with stepped profiles. The connector includes a connector body, two or more optical ports, and two or more cylindrical guide pins. Each guide pin has a first portion with a first length, a second portion with a second length, and a transitional portion between the first and second portions. The first portion has a first diameter. The second portion has a second diameter. The second diameter is less than the first diameter.

20 Claims, 5 Drawing Sheets

OPTICAL CONNECTOR HAVING STEPPED ALIGNMENT PINS

BACKGROUND

A parallel optical fiber connector system of the family that includes Multi-fiber Push-On (MPO) and Multi-fiber Termination Push-On (MTP) facilitates coupling of parallel optical signals. A male connector of this type has a housing or body with a number of parallel optical ports (for example, twelve optical ports) on a flat mating face and two guide pins extending from the mating face. A female connector of this type has a housing or body with a corresponding number of optical ports on a flat mating surface and two openings or bores in that surface. The housing or body can serve as a fiber ferrule by retaining the ends of respective optical fibers of a parallel optical cable in alignment with the optical ports. To mate the male and female connectors, the ends of the guide pins are directed into the bores as the mating faces of the two connectors are brought together. In the fully mated position, corresponding optical ports of the male and female connectors are optically aligned with each other, and the guide pins extend into the bores. The portion of each guide pin that extends from the mating face of the male connector is commonly cylindrical, with a tip that is either frusto-conically shaped (i.e., chamfered) or, alternatively, blunt.

In a system in which both the male and female connectors terminate respective optical ribbon cables (each cable having, for example, twelve parallel optical fibers), the system can be used to couple the optical signals from one of the optical ribbon cables into the other. The system can also be used to couple optical signals between an optical ribbon cable and an optical device such as an optical transceiver module. A transceiver module includes electrical-to-optical (E/O) converters, such as lasers or other light sources, and optical-to-electrical (OLE) converters, such as photodiodes or other light detectors. An optical transceiver having a male connector of the above-described type is known.

SUMMARY

Embodiments of the present invention relate to an optical connector system in which guide pins have stepped profiles. In an exemplary embodiment, the connector system defines a connector that includes a connector body, a plurality of optical ports in a mating face of the connector body, and a plurality of cylindrical guide pins extending from the mating face. The optical ports are aligned in a direction substantially normal to the mating face. The guide pins extend in the same direction substantially normal to the mating face. Each guide pin comprises a first portion having a first length, a second portion having a second length, and a transitional portion between the first portion and the second portion. The first portion has a first diameter. The second portion has a second diameter. The second diameter is less than the first diameter. The connector can be mated with another connector by directing the guide pins into corresponding holes or bores in the other connector as the two connectors are moved closer together, until the first and second portions of the guide pins are fully received within the bores and the optical ports of the two connectors are aligned with each other.

In another aspect, embodiments of the present invention relate to a method for making an optical connector system. A connector body having a mating face is provided. A plurality of optical ports are provided in the mating face. Each optical port is optically aligned in a direction substantially normal to the mating face. A plurality of cylindrical guide pins extending in the direction substantially normal to the first connector mating face are provided. Each guide pin comprises a first portion having a first length, a second portion having a second length, and a transitional portion between the first portion and the second portion. The first portion has a first diameter. The second portion has a second diameter. The second diameter is less than the first diameter. In providing the guide pins, the transitional portion of a guide pin can be polished by pressing a lap against an edge of the transitional portion while rotating the guide pin.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

DETAILED DESCRIPTION

Figure 1:
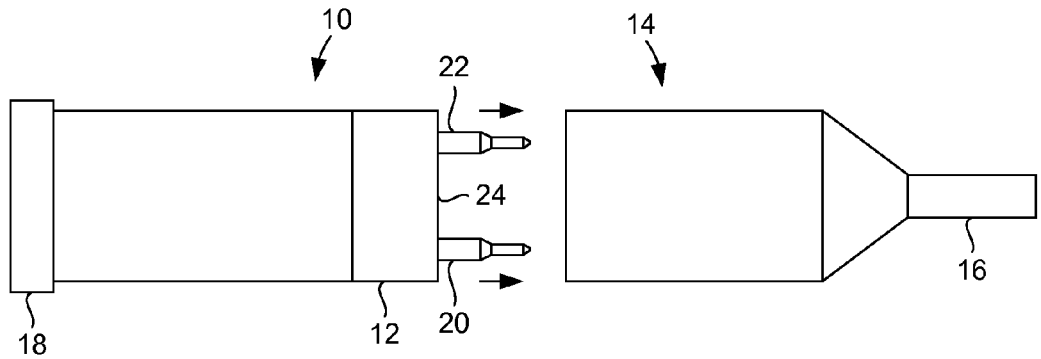
FIG. 1 is a top plan view of an optical connector system, in accordance with an exemplary embodiment of the invention.

As illustrated in FIG. 1, in an illustrative or exemplary embodiment of the invention, an optical connector system includes an optical transceiver 10 with a forward end having a male optical connector 12. The optical connector system further includes a female optical connector 14. Female optical connector 14 is coupled to an optical ribbon cable 16. Although not shown for purposes of clarity, optical ribbon cable 16 carries a number of optical fibers, such as, for example, twelve optical fibers. Although not shown for purposes of clarity, optical transceiver 10 includes electrical-to-optical (E/O) converters, such as lasers or other light sources, as well as optical-to-electrical (OLE) converters, such as photodiodes or other light detectors. An electrical connector 18 at a rearward end of optical transceiver 10 can be plugged into a mating electrical connector of an external system (not shown), such as a switching system or processing system, to communicate electrical signals representing transmitted and received data.

Figure 2:
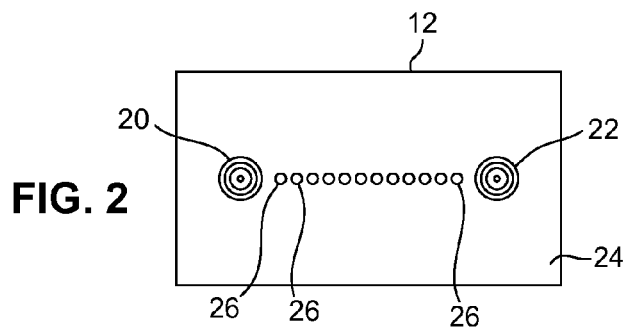
FIG. 2 is an end elevation view of a male connector of the optical connector system or FIG. 1.

With further reference to FIG. 2, male optical connector 12 has two guide pins 20 and 22 extending from a mating surface 24 in a direction substantially normal to mating surface 24. As illustrated in FIG. 2, a number of optical ports 26, such as, for example, twelve optical ports 26, are arrayed in mating surface 24 between guide pins 20 and 22. An optical port 26 can comprise a lens. Although not shown for purposes of clarity, each of optical ports 26 is coupled through an optical path to an E/O converter or an O/E converter in optical transceiver 10.

Figure 3:
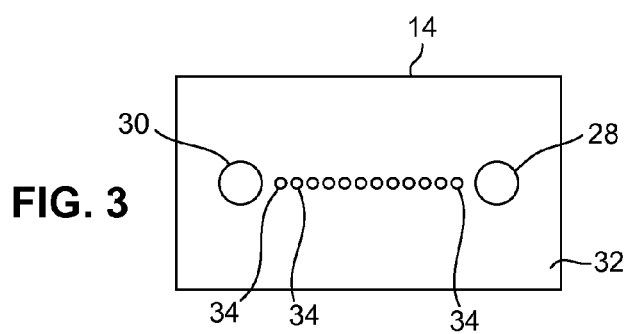
FIG. 3 is an end elevation view of a female connector of the optical connector system or FIG. 1.

As illustrated in FIG. 3, female optical connector 14 has two holes or bores 28 and 30 extending from a mating surface 32 into the body of female optical connector 14. A number of optical ports 34, such as, for example, twelve optical ports 34, are arrayed in mating surface 32 between bores 28 and 30. An optical port 34 may comprise a lens. Although not shown for purposes of clarity, a ferrule in female optical connector 14 retains the end of each optical fiber of optical ribbon cable 16 in optical alignment with a corresponding one of optical ports 34.

Figure 4:
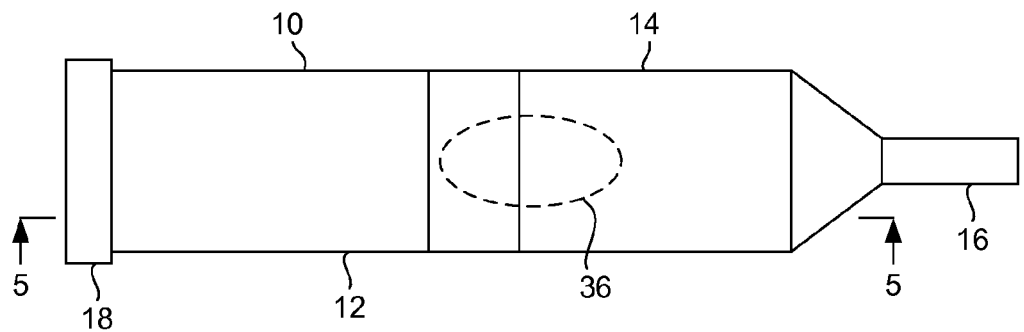
FIG. 4 is similar to FIG. 1, showing the male and female connectors in a fully mated position.
Figure 5:
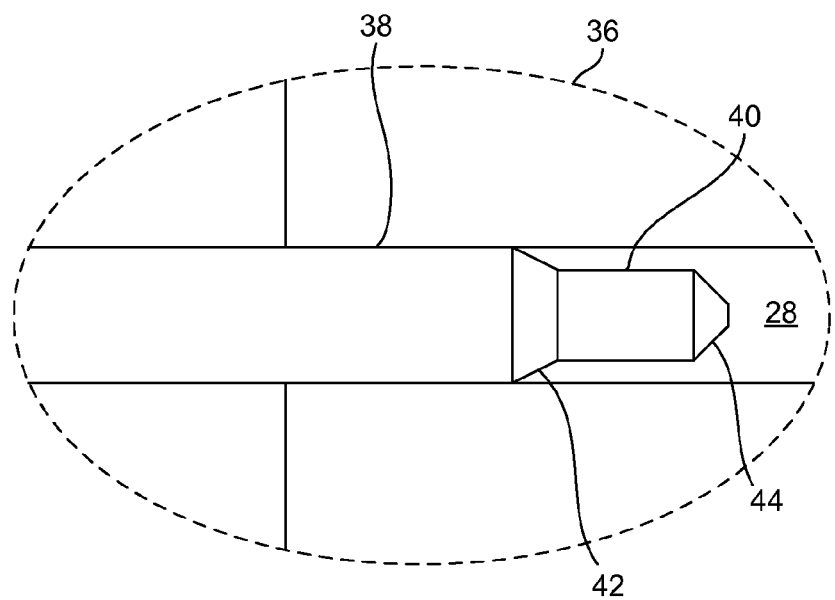
FIG. 5 is a sectional view of an enlarged region of FIG. 4, with the section taken along line 5-5 of FIG. 4.

Male optical connector 12 and female optical connector 14 can be mated by moving one or both of optical transceiver 10 and female optical connector 14 closer to the other (e.g., in the direction indicated by the arrows in FIG. 1) and inserting the ends of guide pins 20 and 22 into bores 28 and 30, respectively, until guide pins 20 and 22 are fully received in bores 28 and 30. As illustrated in FIG. 4, when male optical connector 12 and female optical connector 14 are in the fully mated position, guide pins 20 and 22 are fully received in bores 28 and 30, mating surfaces 24 and 32 abut one another, and optical ports 26 are optically aligned with optical ports 34. As illustrated by the enlarged region 36 in FIG. 5, a first portion 38 of guide pin 20 has a diameter that fits snugly within bore 28, while a second portion 40 of guide pin 20 has a diameter that is less than the diameter of first portion 38. A transitional portion 42 having a frusto-conical shape is disposed between first and second portions 38 and 40. The tip 44 of guide pin 20 is similarly frusto-conical or chamfered. Guide pin 22 and bore 30 within which it is received are not shown in similar detail because the arrangement is identical to the foregoing arrangement of guide pin 20 and bore 28.

Figure 6:
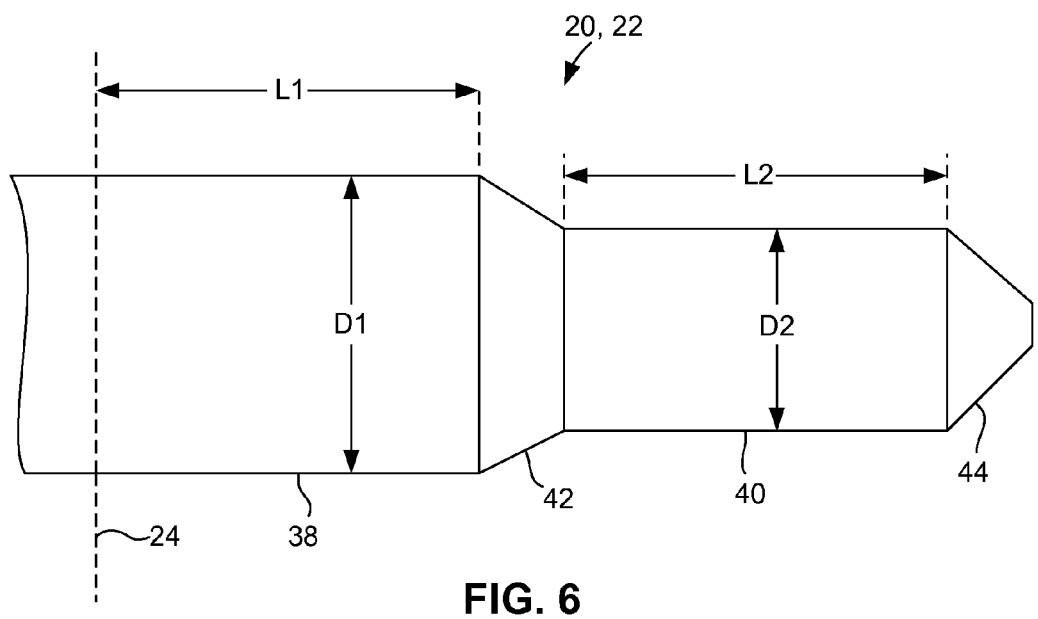
FIG. 6 is a side elevation view of first and second portions of a guide pin of the male connector.

As illustrated in further detail in FIG. 6, first portion 38 of guide pin 20 extends a distance or length L1 from mating surface 24 and has a diameter D1. Similarly, second portion 40 of guide pin 20 has a length L2 and a diameter D2. Note that D2 is less than D1. The reason D2 is less than D1 is that it has been discovered in accordance with the present invention that if D1 were equal to D2, i.e., if the guide pin were to have a uniform diameter from the mating surface to its tip, the act of inserting the tip into a bore can undesirably chip microscopic particles off of the tip or the entrance of the bore. Such microscopic particles can land on the optical ports and impair their optical quality. Furthermore, it has been discovered in accordance with the present invention that if the guide pin were to have a uniform diameter, the bores can wear at an excessive rate with repeated matings of the connectors over time, resulting in decreasing optical alignment accuracy between the optical ports. In addition, it has been discovered in accordance with the present invention that if the guide pin were to have a uniform diameter, excessive insertion force is required to ensure that the guide pin is completely received within the bore, hampering ease of use.

It has been discovered in accordance with the present invention that the above-described problems can be mitigated if L2 is between about twice D2 and ten times D2, and if L1 is between about one-half D1 and about three times D1. With length-to-diameter ratios in these ranges, L1 is long enough to provide a stable and precision fit within bore 28, yet wear and damage from the initial insertion of tip 44 is minimized. The difference between D1 and D2 need only be enough to lower the class of fit. The terms "fit" and "class of fit" are well understood in the art, as are the definitions of different classes of fit, such as Locational Clearance (LC) fits including fit classes LC1, LC2, etc., Locational Transitions (LT) fits including fit classes as LT1, LT2, etc., and Running and Sliding fits including fit classes RC1, RC2, etc. (See, e.g., Machinery's Handbook, Industrial Press, 29$^{th}$ ed.) The fit of D1 to the bore is a high-precision fit meant to locate, such as an LC1 to LC3 fit or an LT1 or LT2 fit. The fit of D2 to the bore is a low-class fit, such as RC5 to RC9.

Figure 7:
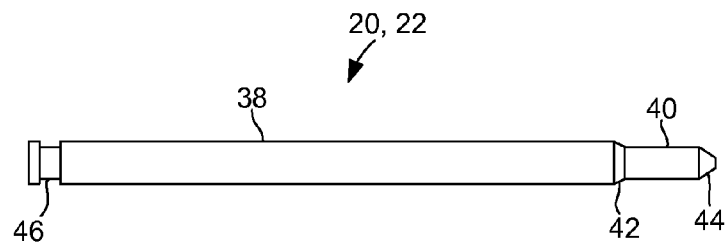
FIG. 7 is similar to FIG. 6, showing an entire guide pin.

Note that the dimensions of guide pin 22 are the same as those of guide pin 20. Although the relevant portions of guide pins 20 and 22 have been described, guide pin 20 is shown in its entirety in FIG. 7 for the sake of completeness. Comparing FIG. 7 with FIG. 1, note that the portions guide pins 20 and 22 rearward of mating surface 24 are retained within the body of male connector 12 and may include a neck feature 46 (FIG. 7) to aid such retention.

Figure 8:
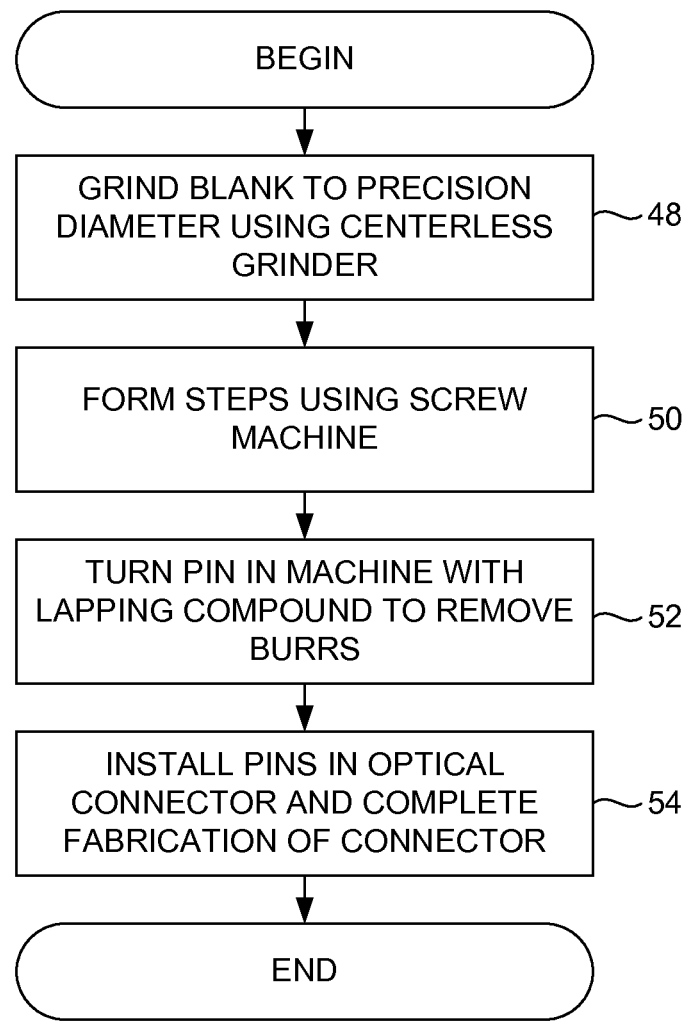
FIG. 8 is a flow diagram illustrating a method for making an optical connector.

As illustrated in FIG. 8, an exemplary method for making a connector can include steps 48, 50, 52 and 54. The method includes making guide pins 20 and 22. In step 48 a cylindrical metal blank (rod) can be ground to a precision diameter using, for example, a centerless grinder machine. Then, in step 50, a screw machine can be used to form the steps or different diameters D1 and D2 in the end of the rod and then to cut the formed end of the rod off so as to produce the guide pin described above (FIG. 7). The screw machine can also form neck feature 46 before cutting the rod. As well understood in the art, a screw machine is a lathe-like machine that can form features in small parts comprising cylindrical sections.

In step 52 the guide pin can then be polished to remove burrs. It has been discovered in accordance with the present invention that the turning process (e.g., screw machine) can leave a burr at the sharp edge where first portion 38 adjoins transitional portion 42 and/or a burr at the sharp edge where second portion 40 adjoins tip 44. During insertion of a guide pin into a bore, the sharp burr may act as a cutting tool and shear off particles of material from the walls of the bore. Also, insertion of a guide pin into a bore may break off particles from the burr itself. Such dust-like particles of material from the bore or the burr can land on the optical ports and impair their optical quality.

Figure 9:
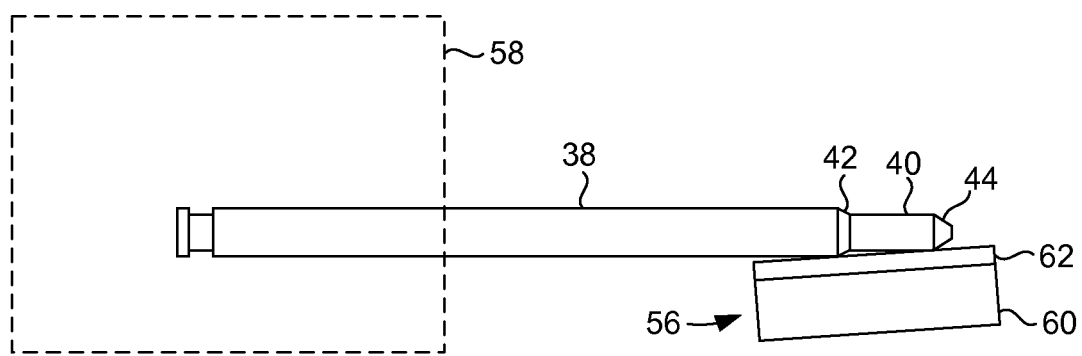
FIG. 9 is a schematic illustration of a step of polishing a guide pin by pressing a lap against the guide pin while rotating the guide pin.

With further reference to FIG. 9, the polishing method of step 52 can include pressing a polishing lap 56 against the above-described sharp edges of the guide pin while rotating the guide pin in a suitable machine 58. Polishing lap 56 can include a rigid backing 60 made of metal, wood or a similar non-compliant material and a pad 62 made of a compliant material. The term "compliant" is intended to refer to a material having a hardness in the range of about 10-80 durometer, such as leather and rubber. The soft or compliant characteristic of such a material allows it to wrap over the sharp edge just enough to remove any burr and smooth the edge. An efficient technique that can provide good results is to orient polishing lap 56 with a planar surface of pad 62 simultaneously in contact with both the sharp edge where first portion 38 adjoins transitional portion 42 and the sharp edge where second portion 40 adjoins tip 44. Orienting polishing lap 56 in this manner is not only efficient but contacts the edges at an optimal angle to remove any burrs and smooth the edges without inadvertently removing other portions of guide pin. A lapping compound or polishing compound can be applied to pad 62. As an alternative to polishing lap 56, polishing paper (not shown) may also be suitable.

Although for purposes of clarity in the exemplary embodiment step 52 is shown as distinct from step 50, in other embodiments polishing can be performed as part of the operation of a screw machine or similar machine. That is, a screw machine or similar machine can be fitted with a polishing lap to automate the step.

In step 54 the polished guide pins 20 and 22 can be included in the manufacture of male connector 12. Other features of male connector 12 can be of any suitable conventional type. Accordingly, other details of the fabrication of male connector 12 are not described herein. Male connector 12 can be included in the manufacture of optical transceiver 10 (FIG. 1).

It should be noted that the invention has been described with respect to illustrative embodiments for the purpose of describing the principles and concepts of the invention. The invention is not limited to these embodiments. As will be understood by those skilled in the art in view of the description being provided herein, many modifications may be made to the embodiments described herein without deviating from the goals of the invention, and all such modifications are within the scope of the invention.

What is claimed is:

1. An optical connector system, comprising:
   a first connector body having a first connector mating face;
   a plurality of first optical ports in the first connector mating face, each first optical port optically aligned in a direction substantially normal to the mating face; and
   a plurality of cylindrical guide pins extending in the direction substantially normal to the first connector mating face, each guide pin comprising a first portion extending from the mating face and having a first length, a second portion having a second length, and a frusto-conically shaped transitional portion between the first portion and the second portion, the first portion having a first diameter, the second portion having a second diameter, wherein the second diameter is less than the first diameter.

2. The optical connector system of claim 1, wherein:
   the first diameter is constant over the first length; and
   the second diameter is constant over the second length.

3. The optical connector system of claim 1, wherein the second length is between about twice the second diameter and about ten times the second diameter.

4. The optical connector system of claim 1, wherein the first length is between about one-half the first diameter and about three times the first diameter.

5. The optical connector system of claim 1, wherein:
   the second length is between about twice the second diameter and about ten times the second diameter; and
   the first length is between about one-half the first diameter and about three times the first diameter.

6. The optical connector system of claim 1, wherein the first connector body is part of an optical transceiver module.

7. The optical connector system of claim 1, further comprising:
   a second connector body having a second connector mating face;
   a plurality of second optical ports in the second connector mating face, each second optical port optically aligned in a direction substantially normal to the mating face; and
   a plurality of cylindrical bores extending in the direction substantially normal to the second connector mating face.

8. A method for mating a first device of an optical connector system with a second device of the optical connector system, the first device comprising a first connector body, a plurality of first optical ports in a first connector mating face, and a plurality of cylindrical guide pins extending in the direction substantially normal to the first connector mating face, the second device comprising a second connector body, a plurality of second optical ports in a second connector mating face, and a plurality of cylindrical bores extending in the second connector mating face, the method comprising:
   moving at least one of the first device and second device closer to each other while inserting each guide pin into a corresponding one of the cylindrical bores, a second portion of each guide pin being inserted before a first portion of each guide pin; and
   continuing to move at least one of the first device and second device closer to each other until the second portion of each guide pin extends into the corresponding one of the cylindrical bores, the first portion of each guide pin having a first length, the second portion of each guide pin having a second length, each guide pin having a frusto-conically shaped transitional portion between the first portion and the second portion, the first portion having a first diameter, the second portion having a second diameter, wherein the second diameter is less than the first diameter.

9. The method of claim 8, wherein the second length is between about twice the second diameter and about ten times the second diameter.

10. The method of claim 8, wherein the first length is between about one-half the first diameter and about three times the first diameter.

11. The method of claim 8, wherein:
    the second length is between about twice the second diameter and about ten times the second diameter; and
    the first length is between about one-half the first diameter and about three times the first diameter.

12. A method for making an optical connector system, comprising:
    providing a first connector body having a first connector mating face;
    providing a plurality of first optical ports in the first connector mating face, each first optical port optically aligned in a direction substantially normal to the mating face; and
    providing a plurality of cylindrical guide pins extending in the direction substantially normal to the first connector mating face, each guide pin comprising a first portion having a first length that extends beyond the mating face, a second portion having a second length, and a frusto-conically shaped transitional portion between the first portion and the second portion, the first portion having a first diameter, the second portion having a second diameter, wherein the second diameter is less than the first diameter.

13. The method of claim 12, wherein providing a plurality of cylindrical guide pins comprises polishing the transitional portion of a guide pin by pressing a lap against an edge of the transitional portion while rotating the guide pin.

14. The method of claim 13, wherein providing a plurality of cylindrical guide pins comprises using an automated machine to both form the transition portion and polish the transitional portion.

15. The method of claim 13, wherein the lap comprises a compliant material having a hardness in a range of about 10-80 durometer.

16. The method of claim 13, wherein the guide pin has a substantially conical tip, and providing a plurality of cylindrical guide pins comprises simultaneously polishing both the transitional portion of a guide pin and the conical tip by simultaneously pressing a lap against both an edge of the transitional portion and an edge of the conical tip while rotating the guide pin.

17. The method of claim 16, wherein the lap comprises a compliant material having a hardness in a range of about 10-80 durometer.

18. The optical connector system of claim 1, wherein one of the guide pins further includes a tip portion adjacent to the second portion and opposed to the mating face.

19. The optical connector system of claim 18, wherein the tip portion is frusto-conically shaped.

20. The method of claim 8, wherein one of the guide pins has a chamfered tip portion adjacent to the second portion.

* * * * *